United States Patent [19]

West

[11] 4,303,309

[45] Dec. 1, 1981

[54] CONTINUOUS HIGH SPEED MODULATION OF LIGHT WITH LIGHT

[76] Inventor: Lawrence C. West, 774 Joyce St., Livermore, Calif. 94550

[21] Appl. No.: 59,324

[22] Filed: Jul. 20, 1979

[51] Int. Cl.³ .................................................. G02B 5/23
[52] U.S. Cl. ............................... 350/354; 331/94.5 M; 331/94.5 K
[58] Field of Search .................... 331/94.5 M, 94.5 L, 331/94.5 K; 350/354, 157, 161, 353, 355–363, 267

[56] References Cited

U.S. PATENT DOCUMENTS 3,617,779  11/1971  Rosenberg ........................... 307/216
3,671,747   6/1972  Duguay .............................. 332/7.51

OTHER PUBLICATIONS

"Tunable Dye Laser Pulse Converte for Production of Picosecond Pulses" by Chan, *App. Phys. Lett.*, vol. 25, No. 7, 1 Oct. 1974.

"Opto-Optic Modulation Based on Gain Saturation" by Gray et al., *IEEE Jour. Quant. Elect.*, vol. QE-14, No. 11, Nov. 19, 1978.

*Primary Examiner*—William L. Sikes
*Assistant Examiner*—Léon Scott, Jr.
*Attorney, Agent, or Firm*—Henry P. Sartorio

[57] ABSTRACT

Method and apparatus for the continuous high speed switching or modulation of light with light. A flow medium containing an active coupling medium is flowed relative to the light beams so as to continually restore the coupling medium which is degraded by interaction with the light beam, thereby maintaining the coupling medium in a desired condition for modulating a light beam. The problem of removal of heat generated by light power dissipation is eliminated by advective flow of the medium.

19 Claims, 2 Drawing Figures

CONTINUOUS HIGH SPEED MODULATION OF LIGHT WITH LIGHT

BACKGROUND OF THE INVENTION

1. Field of the Invention

The present invention generally relates to modulation of light and in particular to extremely fast modulation in which one light beam controls the passage of a second light beam through a coupling medium.

2. Description of Prior Art

Presently, one problem limiting the modulation of light with light at a high speed is the gradual change or degradation of the medium used to couple the modulating light with the modulated light. This undesired medium change can be a rise in temperature, even to the extent of a change in phase such as liquid to gas or solid to liquid, or the gradual loss with time of a coherence between a lower and upper electronic energy level of the medium, or a buildup of a proportion of the medium in any undesirable state.

The modulation of light with light has been proposed previously and several different means for interacting with a medium have been suggested. Such methods are reviewed by R. W. Keyes and J. A. Armstrong in "Thermal Limitations in Optical Logic", Applied Optics, Vol. 8, No. 12, December 1969. This paper estimates a fundamental limitation of 100 W/cm$^2$ or less for the possible rate of heat dissipation. The rate of heat dissipation is shown by Keyes et al to limit the speed at which light controlled light modulators are capable of continuously modulating since the power essentially required always increases with modulation speed for the known mechanisms, as shown in the above paper.

One mechanism for light controlled light modulation is described by M. A. Duguay in U.S. Pat. No. 3,671,747. Light pulses are controlled by the optical induction of birefringence in solid materials, or the optical Kerr effect. The light pulses are of such high intensity as to degrade the materials suggested if the pulses should be applied continuously. Birefringence can also be induced electronically by the Kerr effect for light modulation.

Another modulation mechanism proposed is the saturation of gain or absorption of an optical medium by the controlling light beam. Embodiments have been proposed by Kosonocky, Doctoral Thesis, Columbia University, 1965; N. G. Basov, Soviet Physics Uspekhi, Vol. 12, No. 2, September-October 1969; and R. W. Gray and L. W. Casperson, "Opto-Optic Modulation Based on Gain Saturation", IEEE Journal of Quantum Electronics, Vol. QE-14, No. 11, November 1978. In these devices, the modulation speed is limited by the thermal degradation of the material involved.

A third mechanism for the modulation of light with light is described by J. A. Armstrong and D. R. Grischkowsky in U.S. Pat. No. 3,864,020. The inventors propose the use of the mechanism of adiabatic following for inducing a birefringence in a material such as an alkali metal vapor by "adiabatically" applying a light beam. The maintenance of the birefringence depends on maintaining a high oscillator strength electronic optical transition in a medium in a combination of lower and upper levels with a particular coherence between them. However, for the same required transitions, the radiative decay of the upper state will limit the lifetime of both the upper state and the coherence between the two, therefore only allowing control of pulses of a time width less than the spontaneous time (of order 10 nanoseconds for the high oscillator strengths proposed) and thus preventing continuous control of any light beam.

SUMMARY OF THE INVENTION

It is an object of the invention to perform high speed continuous modulation of light with light.

It is another object of the invention to continually restore the coupling medium between a modulating light beam and modulated light beam.

It is a further object of the invention to remove the heat from power dissipation in the coupling medium.

It is also an object of the invention to provide an extremely fast modulator of light with light useful for optical digital computing or optical communications.

It is another object of the invention to provide extremely fast optical digital logic elements useful for creating an optical digital computer.

The invention includes a method and apparatus for extremely fast and continuous modulation or switching of light with light. The method basically is to flow the medium coupling the modulated and modulating light beams relative to the light beams, thereby allowing restoration of the medium to an undegraded state useful for coupling. The desired state would otherwise gradually be destroyed by the light beam interaction with the medium. A transversely flowing medium, such as a stream of water, organic solvent, or other fluid, which contains the active coupling medium, is utilized to continuously restore the desired coupling state, or the coupling medium itself is flowed transversely to the light beams.

The invention also includes an improved method of saturating the gain or absorption of a medium at an increased rate, and an improved method of modulating light with light through the mechanism of gain or absorption saturation. The invention further includes improved methods of modulating light with light using the mechanisms of adiabatic following and the optical Kerr effect.

The invention also includes an improved laser gate comprising a laser cavity containing a gain medium in which the gain medium or a separate coupling medium is flowed transversely to a modulating beam which controls the laser gate output.

The invention further includes the use of the methods and devices according to the invention for optical computing and for optical communications.

BRIEF DESCRIPTION OF THE DRAWINGS

The invention and its further objects and advantages will be better understood from the following detailed description of various embodiments, cited for the sake of illustration with reference to the accompanying drawings, in which.

DESCRIPTION OF THE PREFERRED EMBODIMENT

The invention employs a medium which couples a controlling light beam to a controlled light beam so as to modulate the controlled light beam solely as a consequence of a modulation existing on the controlling light beam. The improvement according to the invention is to flow the coupling medium at least partially transverse to the direction of travel of the light beams. The active coupling medium, e.g. Rhodamine 6 G dye, is dissolved in and carried with a flow medium, e.g. water, an organic solvent, or another fluid. Alternatively, the coupling medium itself can be flowed. This flow continuously replaces a degraded coupling medium, in a degraded state induced by the light beam, with an undegraded coupling medium in a desirable state suitable for modulating or switching the light beam. One advantage of the restoration is to increase the modulation or switching rate while also allowing continuous modulation or switching.

The invention also applies to the use of more than one modulating light beam to affect a single modulated beam.

Figure 1:
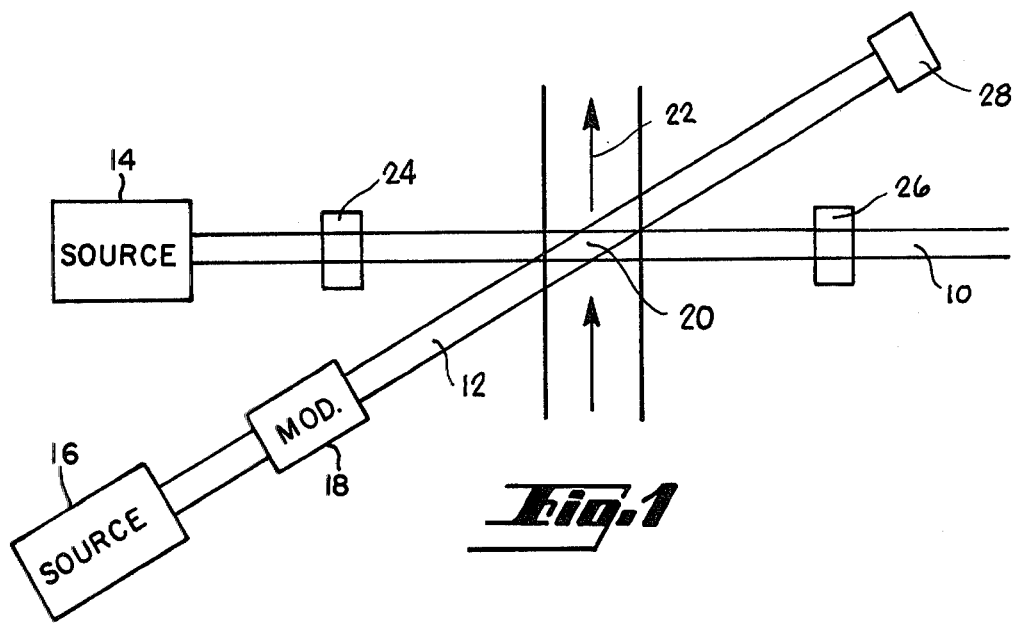
FIG. 1 is a schematic diagram of the invention.

The operation of the invention may best be described with reference to FIG. 1. The controlled light beam 10 is modulated or switched by the controlling light beam 12. The light beam 10 is produced by source 14, and the light beam 12 is produced by source 16 and modulated by modulator 18. The controlling light beam 12 may also be the output of another separate light modulator in an integrated system of such modulators. The light beam 12 may also be any modulated output from a laser, such as a mode-locked or Q-switched laser. The light sources 14 and 16 will preferably be lasers. The modulator 18 will be a conventional high speed modulator of light from electrical input, such as an electro-optic cell. The controlled beam 10 and controlling beam 12 are coupled in region 20 of medium 22 which is continuously flowed transverse to beams 10 and 12 to maintain region 20 in a desired condition for modulating beam 10 by beam 12. The light beams may be focused, or otherwise imaged, onto the region 20 by the use of optics (not shown). The active coupling medium is dissolved in or carried by a separate flow medium such as water, organic solvent or other fluid. Alternatively, the medium 20 is the active coupling medium itself. The flow medium is formed into a suitable stream or jet by nozzles and pumps. The flow medium may be a free-standing stream or may be contained in some type of pipe, with optical windows for the beams. The medium 22 flows past the interaction region 20 at a rate sufficient to allow continuous high speed modulation or switching of light beam 10 with light beam 12. Light beam 12, as a consequence of its modulation, thereby controls the passage of light beam 10. Additional modulating light beams may be applied to the same region 20. The controlling beams need not be spatially separated from each other nor from the controlled beam. As appropriate, the various light beams may be contained in either fibers or thin film optical wave guides.

Other elements 24 and 26 can optionally be added to enhance or change the form of the modulating effect. These may be mirrors to form a laser cavity to support laser action, or mirrors for a Fabry-Perot resonator. The elements may also be polarizers, color filters, or any other optical device or combination of optical devices. Element 28 can be any optical element to block or redirect the light beam 12 after transmission through region 20.

Alternatively, source 14 for beam 10 may be unnecessary, as in a laser device which generates beam 10 as its output. The elements 24 and 26 in that case would be the mirrors forming the laser cavity, containing a gain medium. The laser would include conventional pumping means and energy abstracting means necessary to produce a laser output. The modulation coupling medium and the laser gain medium could be the same or there could be two separate flow streams. In either embodiment the beam 12 would modulate the output of the laser. A laser whose output is switched on and off by a controlling laser beam forms a laser gate. The output of the laser gate is controlled by a modulating light beam acting on a coupling medium which may be identical to or separate from the laser gain medium. Flowing the coupling medium produces a laser gate with a fast switching speed and a high power dissipation level. Additional input light beams may also be utilized to perform auxiliary operations on the coupling medium, such as pumping a laser dye to obtain population inversion.

The improvements obtained by the invention are readily demonstrated with respect to existing technology. Liquid flows of water with a viscosity of about 1 centipoise are commercially available at velocities higher than 700 m/sec at a stream of flow diameter as small as $75\mu$. Small dimensions of the medium are often important in applications because of the time required for light propagation across the medium. At this flow speed, a medium of water with a heat capacity of 4 joules/cm$^3$/°C. can dissipate a power per unit area of 4 joules/cm$^3$/°C.$\times 7 \times 10^4$ cm/sec$=2.8 \times 10^5$ W/cm$^2$/°C. For a typically allowable temperature rise of 50° C., the dissipatable power per unit area through this convection process is $1.4 \times 10^7$ W/cm$^2$ or over a factor of $10^5$ greater than that assumed as a fundamental limit by R. W. Keyes and J. A. Armstrong in the previously mentioned paper. Most fluids have very similar properties to the water stream used in the example.

This power dissipation is possible only if little conduction of heat to the dissipating medium is required so that all heat can be removed by the highly efficient advection process. This is assured by the invention by placing the coupling medium directly in the advective flow medium. As an example, laser dyes such as Rhodamine 6 G can be placed in a liquid solution which is used as the transverse advective stream flow medium. The light beams will interact with the dye molecules, but the heat will be carried away by a fluid such as water or any other solvent for the dye molecules. The rate of transfer of light induced vibrational heat from the dye molecules to the solvent is very fast, usually less than 2 psec, and therefore much faster than any of the other processes involved. The dye containing solvent can be emulsed in still another fluid to create a convective flow medium with a better combination of properties, such as optical quality and higher heat capacity, required for the invention.

Using the invention, this increased ability to dissipate heat generated by light power absorption will increase the rate at which it is possible to saturate the gain or absorption of a given coupling medium. In an absorber medium, the majority of the electrons of the relevant electronic transition lie in a lower energy state so that more light will be absorbed than emitted by the medium in the direction of the original light beam through stimulated emission. If it is desired to saturate this absorption through the absorption of the light by the lower energy electronic states, thereby creating a more equal population in the upper and lower levels, then the time $\tau$ required to absorb the light and cause the saturation must be smaller than the upper state lifetime $T_1$ to cause sufficient saturation. The loss coefficient per unit length is given by $$\alpha = \frac{\alpha_o}{1 + \frac{T_1}{\tau}}$$

where $\alpha_o$ is the unsaturated loss. The light beam power intensity required to cause this switching in a time $\tau$ is given by $$I_{Sat} = \frac{\hbar\omega}{\sigma\tau}$$

where $\hbar\omega$ is the photon energy for light of frequency $\omega$, $\delta$ is the cross section for absorption of the photon. This means that the photon intensity must be sufficiently intense to place a photon in every absorption cross section within the time $\tau$ in order to saturate the absorption. The analysis for saturation of gain follows similarly where the upper rather than the lower state has a greater proportion of the electron population. The cross section $\delta$ will then be the stimulated emission cross section rather than the absorption cross section.

To minimize power consumption under the constraint of a given power intensity, the light beam cross section must be as small as possible, typically of the order of $1\mu$ diameter for visible wavelength light, which is near the diffraction limit of the beam.

The flow of the medium according to the invention will increase the saturating speed of a coupling saturating medium. For $\hbar\omega = 2.13$ eV, $\tau = 10$ psec, $\delta 2 \times 10^{-16}$ cm$^2$ (cross section for either gain or absorption for Rhodamine 6 G), $I_{Sat} = 171$ Megawatts/cm$^2$. For a $1\mu$ square spot, this requires 1.71 watts of light power, much of which is absorbed in the medium. For an absorption or gain length of $12\mu$, which is typical for a near diffraction limit, the area of the light beam seen by the transverse coupling medium is equal to $12\mu \times 1\mu$ so the required power dissipation for the medium is about $1.4 \times 10^7$ W/cm$^2$ which is obtainable according to the invention. Current solid state GaAs laser devices for modulation of light with light as specified by Kosonocky and Basov have had at best 1 nsec continuous modulation times because of thermal dissipation limitations of tens of milliwatts. The invention thus increases this speed of modulation by a factor of 100.

The improved performance may be obtained when the principles of the invention are applied to any system using the saturation of gain or absorption as a means of controlling light with light. Faster modulators can be produced by utilizing a reduced magnitude of effect on the coupling medium by the modulating beam, since a reduction in the magnitude of the required change of the medium will cause the required medium change to occur much faster for the same rate of change. This is useful where the reduced modulations can be amplified by such means as affecting a laser near its threshold lasing point, where an infinitesimal population inversion change will cause a change of a factor $10^{12}$ or more in the laser output power. However, for a given modulation effect required, the above stated method for increase in the full inversion rate $1/\tau$ will always increase the modulation rate.

The method of transverse flow in light controlled light modulators according to the invention may be applied to the adiabatic following method shown in U.S. Pat. No. 3,864,020 to Armstrong, et al. The prior art device suffers from the limitation of pulsed operation. Although the device is designed to switch pulses of widths significantly smaller than the radiative lifetime, pulses greater than the radiative lifetime will cease to be switched after a time equal to the radiative lifetime. However, the coupling medium of alkali metal atomic vapors can be injected into the coupling region at a velocity of the order of $10^5$ cm/sec. With light beam diameters close to the diffraction limit of $1\mu$ the transit time will be 1 nsec or less. Since the radiative lifetimes of the alkali metal vapor excited states are typically of order 10 nsec, replacement of atoms in excited states occurs at sufficient magnitude to allow continuous modulation. As long as the medium is used to switch faster than 1 nsec, then the requirement of the adiabatic following method of a relatively slow or adiabatic increase in light intensity remains valid since the adiabatic condition is useful whether the medium is stationary and the light intensity increased or the light intensity is constant and the intensity on the particular atom is increased at the same relatively slow rate by movement of the atom into the beam.

The method of transverse flow in light controlled light modulators according to the invention may be applied to use with the optical Kerr effect. By flowing a Kerr medium such as $CS_2$ or nitrobenzene, much higher powers may be used before destruction of the medium is caused by the light. Flow velocities need not be as high as those of the saturation effect mentioned previously because of the much lower absorption of light by the Kerr medium. Higher power light increases the modulation speed of Kerr effect modulators by reducing the propagation distance of the light for a given effect. Typically, the optical Kerr effect is the change in refractive index of a media linearly proportional to the intensity of an incident light beam. In particular, the change in refractive index $\Delta n$ is given by $\Delta n = n_2 I$ where I is the light beam intensity. The value of $n_2$ is about $3 \times 10^{-7}$ cm$^2$/MW for nitrobenzene and $3 \times 10^{-9}$ cm$^2$/MW for $CS_2$. The effect of the index change is usually made into a modulation of intensity by using interference with an unaffected beam or polarization of the same beam. This interference usually requires a change in phase of 180° of the light electric field waves. The distance required for this is given by $\Delta n L = \lambda/2$ where $\lambda$ is the wavelength of the light. The switch time is limited by the propagation distance L to a $$\text{time } \frac{L}{c} = \frac{\lambda}{2c\Delta n} = \frac{\lambda}{2cn_2 I}.$$

So the higher the power, the faster the switching speed.

The use of modulation of light with light is particularly advantageous for the purpose of digital data processing at high speeds. The invention can be embodied in an optical logic device such as a laser gate useful for optical digital data processing. A laser whose output is switched on and off by a controlling beam forms a laser gate. The laser is of conventional configuration, comprising a plurality of aligned mirrors forming a resonant laser cavity containing an active gain medium, with associated pumping means for exciting the resonant laser cavity, and energy abstracting means to remove the laser output. The cavity of the laser gate includes a coupling medium for controlling the output by a controlling beam. The output of the laser cavity is the controlled beam. The controlled beam is either switched on or off by the controlling beam, giving a digital 1 or 0 for digital computing. The laser gate will be a multiple input NOR gate for multiple input light beams and has the possibility of fanout greater than 5 for internal small signal single pass gain of 100 and mirrors of 4% reflectivity. The NOR gate is the most useful logic element for computers today. From this element the entire family of logic gates can be constructed. The faster electronic computers today use almost exclusively 4 and 5 input NOR gates. An array of laser gates can be integrated to form an optical digital computer.

Figure 2:
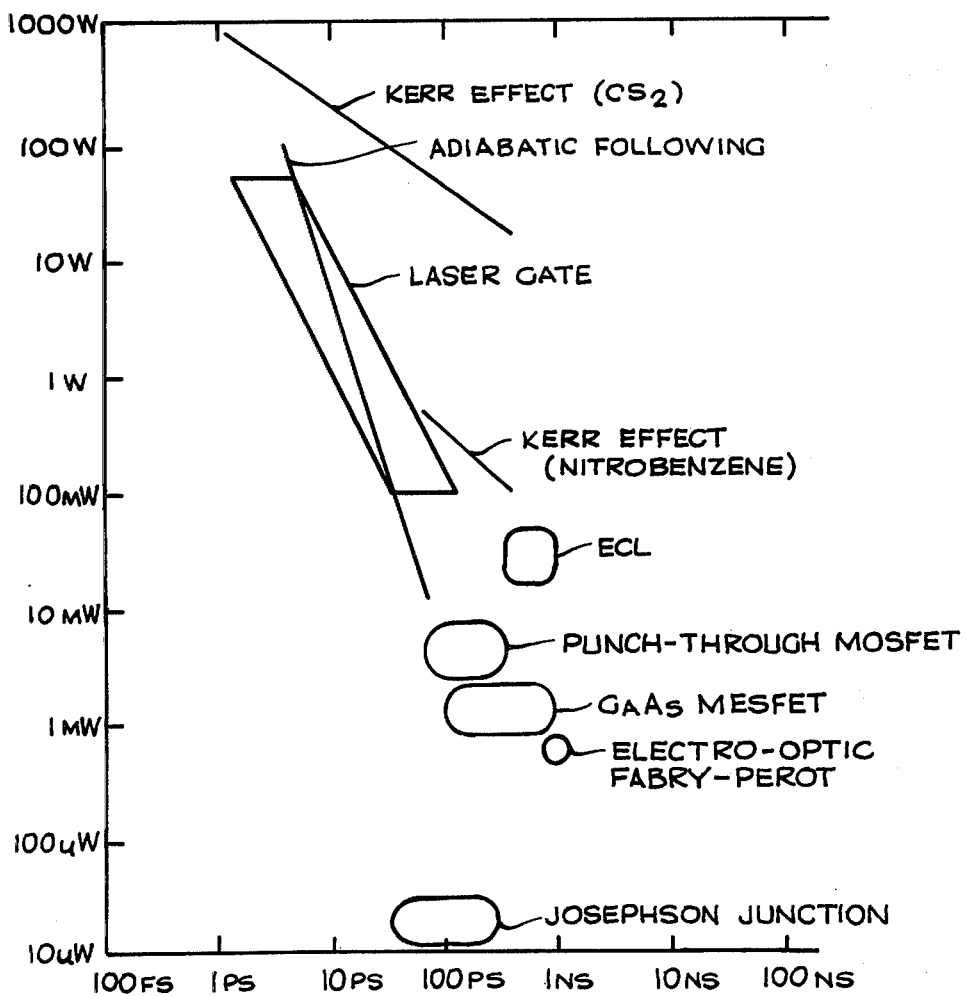
FIG. 2 is a graph showing the powers and response times available by the invention compared to the fastest known modulators capable of operating in a continuous fashion for the purpose of digital logic.

The logic speeds and powers of various optical and electronic logic devices are shown in FIG. 2. The data on the prior art devices have been compiled from the literature. Only ECL is currently available on the market. The power is for each individual logic gate and the switching time is for each individual logic gate when placed in an integrated assembly.

All of the known electronic technologies are limited to switching times of greater than 10 psec. Even if the switching speeds are reduced to tens of psec, the power levels of the individual gates must be lowered as the square of switch speed in order to obtain adequate densities of devices to take advantage of the switch speed because of thermal dissipation problems.

However, despite the greater power consumption of optical logic, the method of flow of the present invention more than compensates for the extra power consumption. Thus the invention not only permits very fast individual device switch time, but also allows the integration of sufficient densities of devices to take advantage of this speed. A 75μ diameter liquid stream is crossed by light in a time of about 0.38 psec, which is much smaller than the time of 2 psec given as a limit of the speed of the laser gate device if the limiting time is due to dye vibrational relaxation. This increase in logic speed has particular applications in digital data processing, digital computers, and digital communications. The invention permits a high device density so that the very fast switching times obtainable are not limited by the transit time of the light beams. To achieve the necessary device density, high power dissipation capability is required, which it has been previously shown is provided by the invention. The methods and devices according to the invention for fast switching at high powers are useful for optical communication.

Of course, other embodiments and adaptations may be provided without going beyond the scope of the invention. It will be obvious to those skilled in the art that various changes may be made without departing from the scope of the invention and the invention is not to be considered limited to what is described in the specification.

What is claimed is:

1. A method for increasing the speed of modulation of light with light in a coupling medium that enables a controlling light beam directed at the coupling medium to control passage of a controlled light beam through the medium, the speed of modulation being limited by the rate of heat dissipation in the medium, comprising:
   directing a controlling light beam and a controlled light beam to an interaction region of the coupling medium; and
   advectively cooling the coupling medium by continuously flowing the coupling medium through the interaction region at least partly transversely to the controlling and controlled light beams to increase the rate of heat dissipation in the coupling medium, thereby increasing the speed of modulation.

2. The method of claim 1 wherein the coupling medium is contained and transported in a separate flow medium that is flowed through the interaction region at least partly transversely to the controlling and controlled light beams.

3. The method of claim 2 wherein the separate flow medium is a solvent and the coupling medium is a molecular dye dissolved in the solvent.

4. The method of claim 1 wherein the coupling medium is a saturable absorber and the controlling light beam saturates the absorption of the coupling medium.

5. The method of claim 1 wherein the coupling medium is a saturable gain medium and the controlling light beam saturates the gain of the coupling medium.

6. The method of claim 1 wherein the coupling medium exhibits birefrigence in response to adiabatic application of the controlling light beam and the controlling light beam is adiabatically applied to the coupling medium.

7. The method of claim 1 wherein the coupling medium exhibits an optical Kerr effect in response to the controlling light beam.

8. Apparatus for increasing the speed of modulation of light with light in a coupling medium that enables a controlling light beam directed at the coupling medium to control passage of a controlled light beam through the medium, the speed of modulation being limited by the rate of heat dissipation in the medium, comprising:
   first means disposed about the coupling medium for directing a controlling light beam to an interaction region of the coupling medium;
   second means disposed about the coupling medium for directing a controlled light beam to the same interaction region of the coupling medium; and
   third means disposed about the coupling medium to continuously flow the coupling medium at least partly transversely to the controlling and controlled light beams to provide advective cooling of the coupling medium to increase the rate of heat dissipation in the coupling medium and the speed of modulation.

9. The apparatus of claim 8, wherein the coupling medium is contained and transported in a separate flow medium which is continuously flowed at least partly tranversely to the controlling and controlled light beams.

10. The apparatus of claim 9 wherein the separate flow medium is a solvent and the coupling medium is a molecular dye dissolved in the solvent.

11. The apparatus of claim 8 wherein the coupling medium is a saturable absorber.

12. The apparatus of claim 8 wherein the coupling medium is a saturable gain medium.

13. The apparatus of claim 8 wherein the coupling medium is a birefrigent medium that exhibits birefringence in response to adiabatic application of the controlling light beam.

14. The apparatus of claim 8 wherein the coupling medium is a Kerr medium that exhibits an optical Kerr effect in response to the controlling light beam.

15. A laser gate having increased speed of switching an output of the laser gate on and off, comprising:
   a resonant laser cavity containing an active gain medium, pumping means connected to the resonant cavity for exciting the gain medium, and energy extracting means disposed about the cavity for removing an output of the laser cavity, the resonant laser cavity including a coupling medium to switch the output of the laser cavity on and off by means of a controlling beam incident on an interaction region of the coupling medium, the coupling medium being flowed to provide advective cooling of the coupling medium to increase heat dissipation and switching speed.

16. The laser gate of claim 15 wherein the flowing coupling medium is a gain medium.

17. The laser gate of claim 15 wherein the flowing coupling medium is a saturable absorber.

18. The laser gate of claim 15 wherein the flowing coupling medium includes a solvent containing a dissolved molecular dye.

19. The laser gate of claim 15 wherein the flowing coupling medium exhibits the optical Kerr effect.

* * * * *